United States Patent
Cai et al.

(10) Patent No.: US 11,277,894 B2
(45) Date of Patent: Mar. 15, 2022

(54) UNIVERSAL ADAPTER FOR LIGHTING SYSTEM FOR INDOOR GROW APPLICATION

(71) Applicant: HGCI, Inc., Las Vegas, NV (US)

(72) Inventors: Dengke Cai, Camas, WA (US); Martin Ray Mason, Jr., Vancouver, WA (US); Karl Frederick Thompson Shrom, Columbus, OH (US)

(73) Assignee: HGCI, INC., Las Vegas, NV (US)

( * ) Notice: Subject to any disclaimer, the term of this patent is extended or adjusted under 35 U.S.C. 154(b) by 0 days.

(21) Appl. No.: 16/937,390

(22) Filed: Jul. 23, 2020

(65) Prior Publication Data

US 2021/0029793 A1 Jan. 28, 2021

Related U.S. Application Data

(60) Provisional application No. 62/877,811, filed on Jul. 23, 2019.

(51) Int. Cl.
*H05B 45/14* (2020.01)
*H05B 45/385* (2020.01)
(Continued)

(52) U.S. Cl.
CPC ............. *H05B 45/14* (2020.01); *A01G 7/045* (2013.01); *A01G 9/249* (2019.05); *F21V 23/008* (2013.01);
(Continued)

(58) Field of Classification Search
CPC .... H05B 45/14; H05B 45/385; H05B 47/165; H05B 47/175; F21V 23/008; F21V 23/06;
(Continued)

(56) References Cited

U.S. PATENT DOCUMENTS

2006/0245174 A1 11/2006 Ashdown et al.
2009/0184662 A1* 7/2009 Given ................... H05B 45/10
315/294
(Continued)

FOREIGN PATENT DOCUMENTS

WO 2017117195 A1 7/2017
WO 2018201250 A1 11/2018

OTHER PUBLICATIONS

Thomas, Shane; International Search Report and Written Opinion of the International Searching Authority issued in International Application No. PCT/US2020/043320; dated Oct. 20, 2020; 11 pages.

*Primary Examiner* — Renan Luque
(74) *Attorney, Agent, or Firm* — Ulmer & Berne LLP

(57) ABSTRACT

An adapter includes a power input and output, a control input and output, a detection module, and a signal conversion module. The control input is configured to receive an original driver signal. The detection module is in signal communication with the control input and is configured to detect a first communication protocol of the original driver signal. The signal conversion module is in signal communication with the detection module and is configured to convert the original driver signal into an LED-compatible driver signal that includes a second communication protocol that is different from the first communication protocol. The control output is in signal communication with the signal conversion module and is configured to facilitate transmission of the LED-compatible driver signal to an LED light fixture. The signal conversion module is configured to convert the original driver signal into the LED-compatible driver signal based upon the first and second communication protocols.

20 Claims, 3 Drawing Sheets

(51) Int. Cl.

| | |
|---|---|
| *A01G 9/24* | (2006.01) |
| *A01G 7/04* | (2006.01) |
| *H05B 47/165* | (2020.01) |
| *F21V 23/00* | (2015.01) |
| *F21V 23/06* | (2006.01) |
| *F21Y 105/10* | (2016.01) |
| *F21Y 115/10* | (2016.01) |

(52) U.S. Cl.
CPC ........... *F21V 23/06* (2013.01); *H05B 45/385* (2020.01); *H05B 47/165* (2020.01); *F21Y 2105/10* (2016.08); *F21Y 2115/10* (2016.08)

(58) Field of Classification Search
CPC ....... F21V 23/009; A01G 9/249; A01G 7/045; F21Y 2105/10; F21Y 2115/10; F21S 2/00
See application file for complete search history.

(56) References Cited

U.S. PATENT DOCUMENTS

| | | | | |
|---|---|---|---|---|
| 2014/0312775 | A1* | 10/2014 | Steedly | H05B 45/10 |
| | | | | 315/127 |
| 2015/0048762 | A1* | 2/2015 | Yang | H05B 47/10 |
| | | | | 315/307 |
| 2015/0264759 | A1* | 9/2015 | Hatta | H05B 47/18 |
| | | | | 315/291 |
| 2015/0311803 | A1* | 10/2015 | Schaemann | H02M 1/12 |
| | | | | 315/210 |
| 2016/0141879 | A1 | 5/2016 | Motsenbocker | |
| 2016/0286628 | A1* | 9/2016 | Cho | H05B 47/22 |
| 2017/0105272 | A1* | 4/2017 | Johnson | H05B 47/185 |

* cited by examiner

UNIVERSAL ADAPTER FOR LIGHTING SYSTEM FOR INDOOR GROW APPLICATION

REFERENCE TO RELATED APPLICATION

This application claims priority of U.S. provisional patent application Ser. No. 62/877,811, entitled Universal Adapter for Lighting System for Indoor Grow Application, filed Jul. 23, 2019, and hereby incorporates this provisional patent application by reference herein in its entirety.

TECHNICAL FIELD

The apparatus described below generally relates to powering and controlling a greenhouse lighting system. In particular, a universal control adapter is provided that receives and translates control signals from a greenhouse and indoor grow automation system to power LED (Light Emitting Diode) lighting.

BACKGROUND

Conventional greenhouse and indoor grow automation systems are configured to control dimming and scheduling, as well as other parameters, of high intensity discharge (HID) lights and/or xenon lights. The control architecture that is utilized to facilitate control of these types of lights is not backwards compatible with LED lights. Therefore, upgrading a greenhouse with LED lights typically requires the greenhouse automation system to be completely replaced with an LED compatible system, which can be time consuming and expensive.

BRIEF DESCRIPTION OF THE DRAWINGS

Various embodiments will become better understood with regard to the following description, appended claims and accompanying drawings wherein:

DETAILED DESCRIPTION

Figure 1:
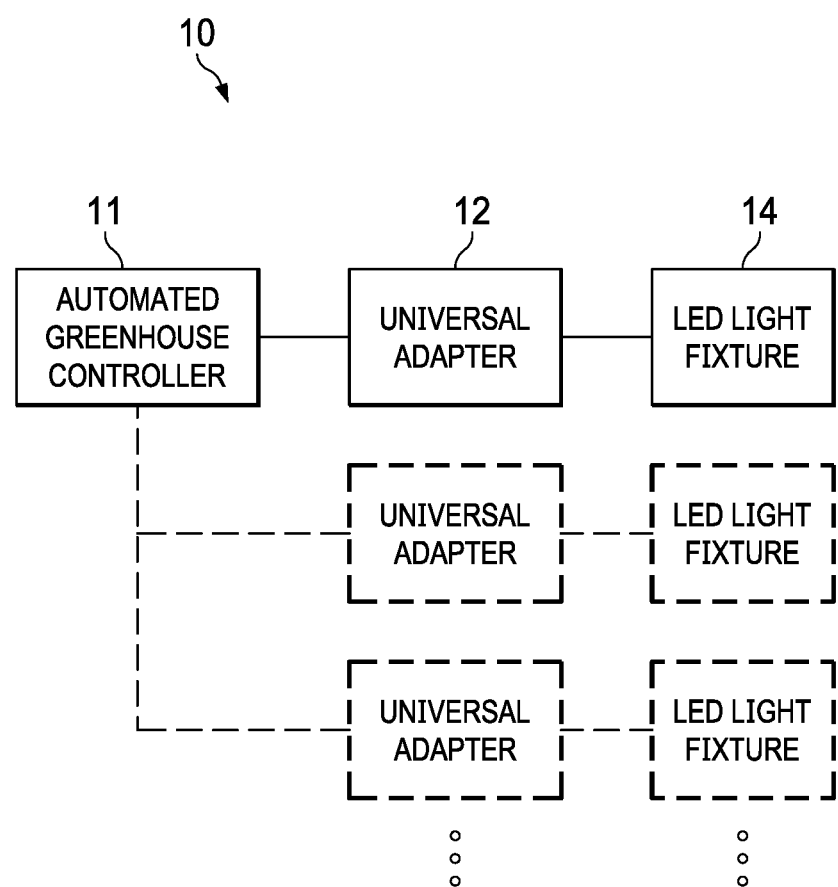
FIG. 1 is a schematic view depicting a lighting system having a universal adapter and an LED light fixture, in accordance with one embodiment.

Embodiments are hereinafter described in detail in connection with the views and examples of FIGS. 1-3, wherein like numbers indicate the same or corresponding elements throughout the views. A lighting system 10 for an indoor grow facility (e.g., a greenhouse) is generally depicted in FIG. 1 and is shown to include an automated greenhouse controller 11, a universal adapter 12 coupled with the automated greenhouse controller 11, and an LED light fixture 14 coupled with the universal adapter 12. The universal adapter 12 can receive an original driver signal from the automated greenhouse controller 11 and can facilitate control of the intensity of the LED light fixture 14 based upon the original driver signal. The lighting system 10 can include other universal adapters that are in signal communication with the automated greenhouse controller 11 (shown in solid lines), such that the original driver signal from the automated greenhouse controller 11 can be transmitted to the other adapters to facilitate dimming of other LED light fixtures (shown in dashed lines).

The original driver signal generated by the automated greenhouse controller 11 can be configured to control one or more non-LED light fixtures (e.g., HID or xenon lights) using a signal protocol (e.g., an original signal protocol) that is compatible with the non-LED light fixture(s), such as, for example, an analog signal protocol (e.g., 0-10 VDC, 0-20 VDC, 4-20 mA, 0-20 mA) or a digital signal protocol (e.g., RS-485, ModBus, BacNET, CamNET, ASCII). The original signal protocol, however, can be inadequate to properly control the LED light fixture directly. As will be described in further detail below, the universal adapter 12 can be configured to detect the original signal protocol of the original driver signal and automatically convert the original signal protocol into an LED-compatible output control signal (e.g., an LED-compatible driver signal) that has an LED-compatible signal protocol that facilitates control of at least one parameter of the LED light fixture 14, such as, for example, dimming (e.g., lighting intensity). The universal adapter 12 can accordingly be used to retrofit a conventional lighting system that has non-LED light fixtures with LED light fixtures (e.g., 14), without requiring replacement of the automated greenhouse controller 11, which can be costly and time consuming.

Figure 2:
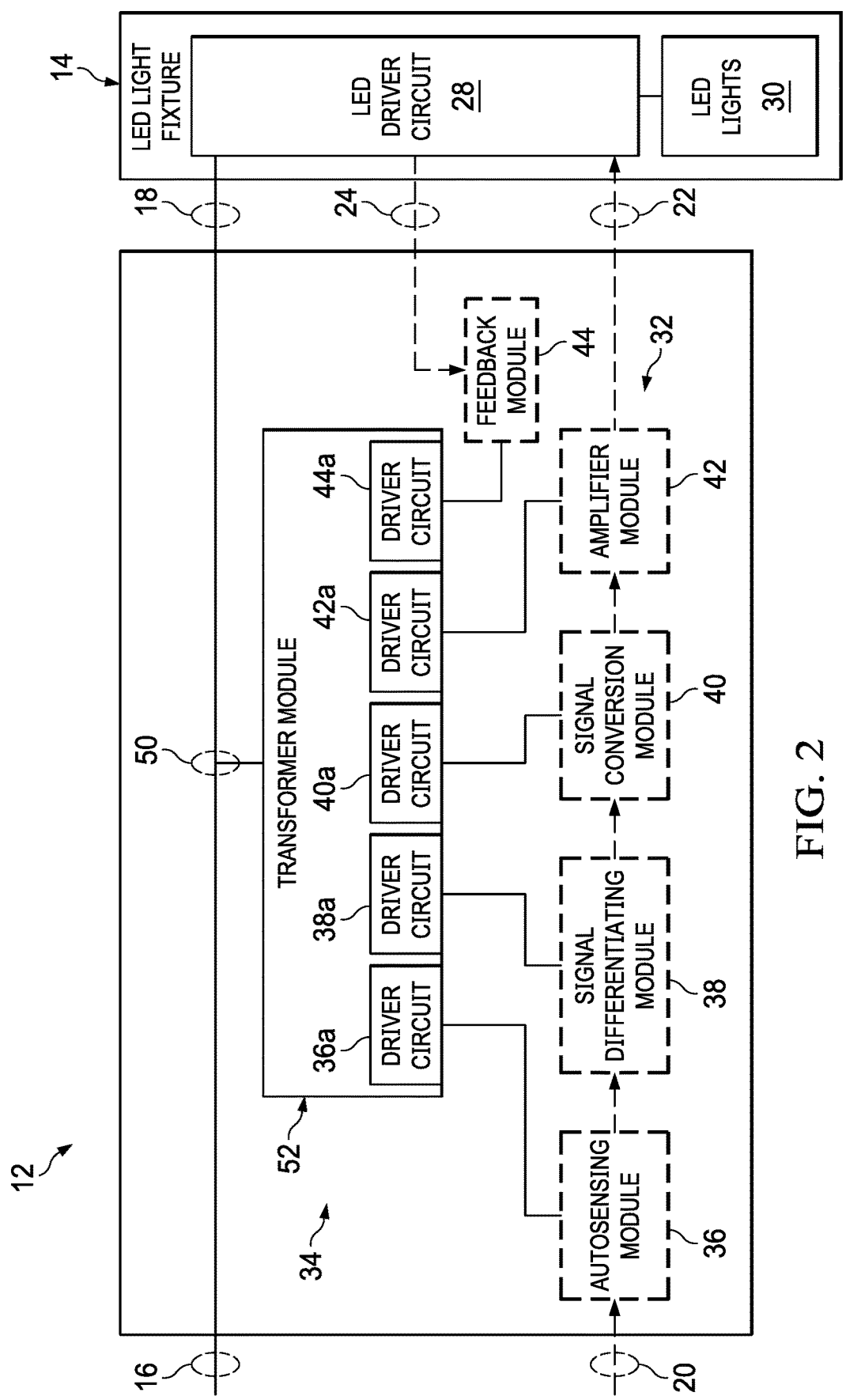
FIG. 2 is a schematic view of the universal adapter of FIG. 1.

Referring now to FIG. 2, a schematic view of the universal adapter 12 is illustrated and will now be described. The universal adapter 12 can include a power input 16 and a power output 18. A power source, such as an A/C power source, can be electrically coupled with the power input 16 by an input power cable (not shown). The power output 18 can be electrically coupled with the LED light fixture 14 by an output power cable (not shown). Each of the input and output power cables can include any suitable connector (e.g., a Weiland connector) provided on opposing ends that facilitate releasable electrical coupling between the universal adapter 12 and each of the power source and the LED light fixture 14. The power provided to the power input 16 of the universal adapter 12 can facilitate powering of the universal adapter 12, as will be described in further detail below. The power from the power input 16 can also be transmitted to the LED light fixture 14 (via the power output 18) to facilitate powering thereof. In one embodiment, the universal adapter 12 and the LED light fixture 14 can be configured to operate at an input power of between about 85 VAC and about 347 VAC (e.g., a 750 Watt load capacity).

The universal adapter 12 can also include a control input 20, a control output 22, and a feedback input 24. The control input 20 can be in signal communication (e.g., communicatively coupled) with the automated greenhouse controller 11 (FIG. 1) for receiving the original driver signal from the automated greenhouse controller 11. The control input 20 can be in signal communication with the automated greenhouse controller 11 by a communication cable (not shown) that includes any suitable connector (e.g., a Weiland connector) disposed on opposing ends to facilitate releasable communicative coupling therewith.

The control output 22 and the feedback input 24 can be in signal communication with the LED light fixture 14 to facilitate bidirectional communication with the LED light fixture 14 to facilitate control thereof. The control output 22 and the feedback input 24 can be in signal communication with the automated greenhouse controller 11 by one or more communication cables (not shown) that include any suitable connector (e.g., a Weiland connector) disposed on opposing ends to facilitate releasable communicative coupling therewith.

Still referring to FIG. 2, the LED light fixture 14 can include an LED driver circuit 28 and a plurality of LED lights 30 electrically coupled with the LED driver circuit 28. The power output 18 can be electrically coupled with the LED driver circuit 28 to facilitate powering of the LED lights 30. The control output 22 and the feedback input 24 can be in signal communication with the LED driver circuit 28. The LED-compatible driver signal generated by the universal adapter 12 can be transmitted to the LED driver circuit 28, which can in turn control the powering of the LED lights 30 in accordance with the LED-compatible driver signal.

Figure 3:
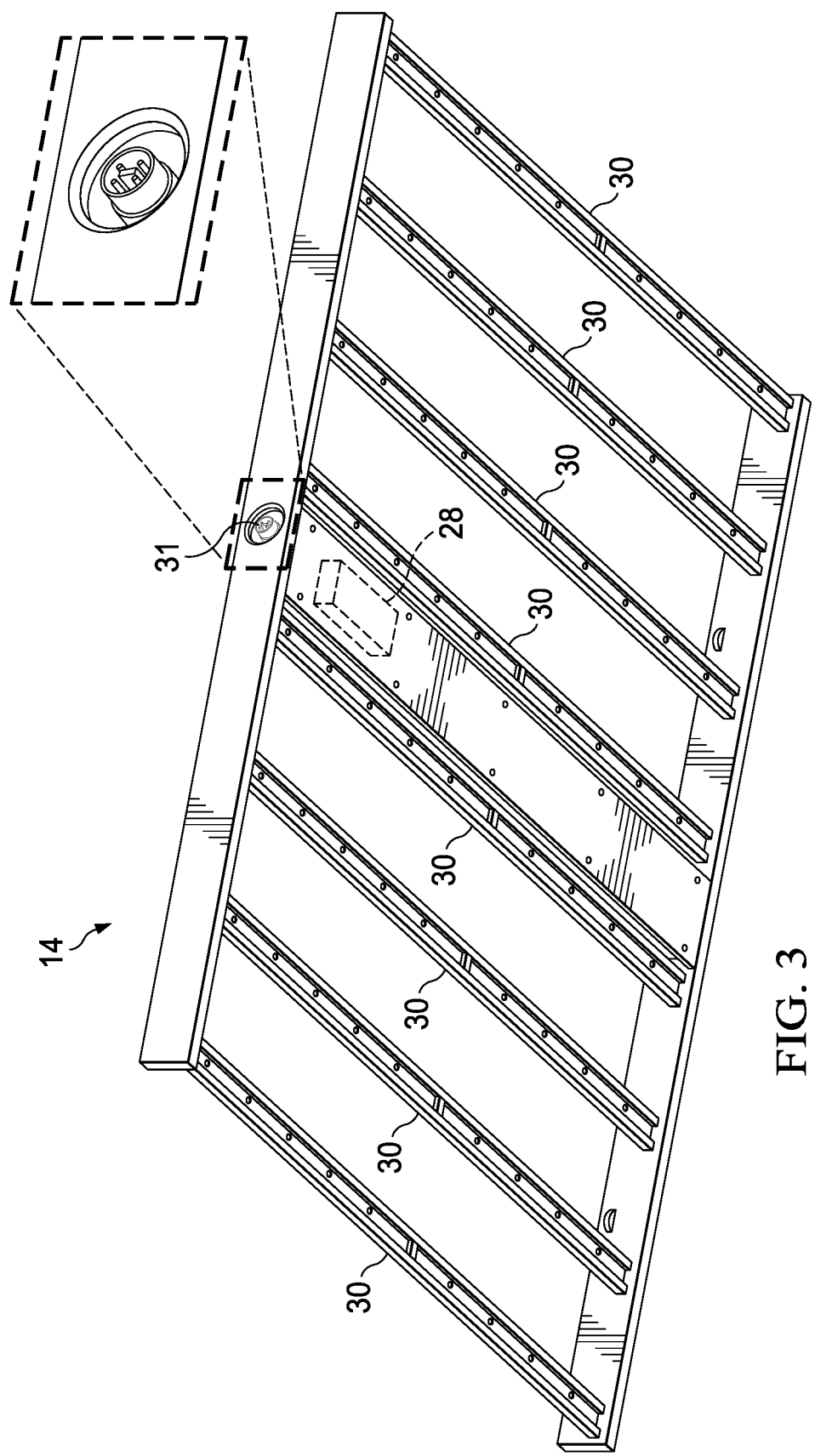
FIG. 3 is an elevational view of the LED light fixture of FIG. 1.

Referring now to FIG. 3, the LED light fixture 14 can include an input power/communication interface 31 that facilitates routing of the power and the LED-compatible driver signal to the LED driver circuit 28 and also facilitates routing of a feedback signal from the LED driver circuit 28 to the universal adapter 12. The input power/communication interface 31 can be coupled with the power output 18 of the universal adapter 12 via a cable (not shown). In one embodiment, each of the power output 18, the control output 22, and the feedback input 24 can be housed in an individual cable such that the power, the LED-compatible control signal, and the feedback signal can be transmitted to/from the LED light fixture 14 on the same cable. In another embodiment, the universal adapter 12 and the LED light fixture 14 can each include separate interfaces (e.g., ports) for the power, the LED-compatible driver signal, and the feedback signal such that the power, the LED-compatible driver signal, and the feedback signal are transmitted to the LED light fixture 14 along different cables.

Referring again to FIG. 2, the universal adapter 12 can comprise a communication system 32 (shown in dashed lines) and a power system 34 (shown in solid lines). The communication system 32 can be configured to detect the original communication protocol of the original driver signal and convert the original driver signal into an LED-compatible driver signal that has an LED-compatible communication protocol that is different from the original communication protocol and is suitable to control the LED light fixture 14. The communication system 32 can comprise an autosensing module 36, a signal differentiating module 38, a signal conversion module 40, and an amplifier module 42. The autosensing module 36 can be in signal communication with the control input 20 and the signal differentiating module 38. The signal differentiating module 38 can be in signal communication with the signal conversion module 40 which can be in signal communication with the amplifier module 42. The amplifier module 42 can be in signal communication with the control output 22. As will be described in further detail below, the original driver signal can propagate through the autosensing module 36 and the signal differentiating module 38 to the signal conversion module 40 which can convert the original driver signal into the LED-compatible signal. The LED-compatible signal can then be transmitted though the amplifier module 42 and to the LED light fixture 14 to facilitate control thereof.

The autosensing module 36 and the signal differentiating module 38 can cooperate to facilitate detection of the original communication protocol of the original driver signal. For example, when the original driver signal propagates through the autosensing module 36, the autosensing module 36 can be configured to detect whether the original driver signal is an analog signal or a digital signal (e.g., the signal type). The autosensing module 36 can then transmit signal type data to the signal differentiating module 38 that identifies the signal type detected by the autosensing module 36.

Using the detected signal type from the autosensing module 36, the signal differentiating module 38 can be configured to detect the original communication protocol of the digital or analog original driver signal. The signal differentiating module 38 can then transmit protocol data to the signal conversion module 40 that identifies the original communication protocol detected by the signal differentiating module 38. In one embodiment, the signal type data and the protocol data can be communicated to the signal differentiating module 38 and the signal conversion module 40, respectively, over the same communication channel as the original driver signal (e.g., as a data packet). In another embodiment, the signal type and the protocol data can be communicated to the signal differentiating module 38 and the signal conversion module 40, respectively, over a different communication channel (e.g., a different communication cable) from the original driver signal.

The signal conversion module 40 can be configured to convert the original driver signal into the LED-compatible driver signal based upon the original communication protocol detected by the signal differentiating module 38 and the LED-compatible communication protocol required to properly control the LED driver circuit 28. In one embodiment, the signal conversion module 40 can be configured to query the LED driver circuit 28 for the LED-compatible communication protocol required to properly control the LED driver circuit 28. In another embodiment, the signal conversion module 40 can be preprogrammed (e.g., by a user) with the LED-compatible communication protocol.

The LED-compatible driver signal generated by the signal conversion module 40 can have a different communication protocol (e.g., the LED-compatible protocol) than the original communication protocol but can control the LED light fixture 14 in a similar manner as requested by the original driver signal. For example, if the original driver signal requests a 30% intensity for the LED light fixture 14, the signal conversion module 40 can convert the original driver signal into an LED-compatible signal that controls the LED light fixture 14 to achieve a 30% intensity. In one embodiment, the signal conversion module 40 can include a predefined conversion map that defines how various different original communication protocols are translated into various different LED-compatible communication protocols. In such an embodiment, the signal conversion module 40 can reference the predefined conversion map using the original communication protocol detected by the signal differentiating module 38 and the LED-compatible communication protocol required to properly control the LED driver circuit 28 to facilitate conversion of the original driver signal into the LED-compatible driver signal. It is to be appreciated that, although a communication protocol is described above, any of a variety of suitable alternative signal characteristics can be detected by a detection module (e.g., the autosensing module 36 and the signal differentiating module 38) to facilitate conversion of the original driver signal into an LED-compatible driver signal.

One example of converting the original driver signal into an LED-compatible driver signal will now be described. For purposes of this example, the original driver signal comprises a digital RS-485 signal that facilitates control of the dimming of an associated HID/xenon light between 0% intensity and 100% intensity. The LED driver circuit 28, however, can require an analog 0-10 VDC signal (e.g., the LED-compatible communication protocol) for controlling the intensity of the LED lights 30 between 0% intensity and 100% intensity. Initially, the original driver signal can propagate through the autosensing module 36 which can detect that the original driver signal is a digital signal. The autosensing module 36 can then transmit the detected signal type (e.g., as signal-type data) to the signal differentiating module 38 to identify to the signal differentiating module 38 that the original driver signal is a digital signal. The original driver signal can then propagate through the signal differentiating module 38, which can analyze the original driver signal to detect the type of digital communication protocol that is being used by the original driver signal. Once the signal differentiating module 38 detects that the original driver signal comprises an RS-485 communication protocol, it can then transmit the detected protocol (e.g., as protocol data) to the signal conversion module 40 to identify to the signal conversion module 40 that the original communication protocol is RS-485. The signal conversion module 40 can then convert the original driver signal from a digital RS-485 signal into a corresponding analog 0-10 VDC signal (e.g., the LED-compatible driver signal) that will achieve substantially the same light intensity requested by the original driver signal.

Still referring to FIG. 2, once the signal conversion module 40 has converted the original driver signal into the LED-compatible driver signal, the LED-compatible driver signal can be transmitted to the amplifier module 42 which can amplify the LED-compatible driver signal to an appropriate magnitude for controlling the LED driver circuit 28. An amplified version of the LED-compatible driver signal can then be transmitted to the control output 22 for transmission to the LED driver circuit 28.

The communication system 32 can also include a feedback module 44. During operation of the LED light fixture 14, the LED driver circuit 28 can generate a feedback signal that includes data for at least one operational parameter (e.g., light intensity) of the LED light fixture 14. The feedback module 44 can be configured to monitor the at least one operational parameter of the LED light fixture 14 provided by the feedback signal (via the feedback input 24) and adjust the LED-compatible driver signal accordingly to ensure proper operation of the LED light fixture 14. Some examples of an operational parameter monitored by the feedback module 44 can include power consumption, temperature, humidity, and/or carbon dioxide levels at the LED light fixture 14.

Still referring to FIG. 2, the power system 34 can comprise a main bus 50 that is coupled to each of the power input 16 and the power output 18 such that the input power is available at the main bus 50 to facilitate powering of the LED light fixture 14. The power system 34 can include a transformer module 52 that is configured to transform the AC power from the main bus 50 into DC power for powering the communication system 32. In one embodiment, the transformer module 52 can comprise a flyback circuit.

The transformer module 52 can be configured to generate different DC voltages (e.g., 5 VDC, 12 VDC, 15 VDC) for the communication system 32. In one embodiment, the transformer module 52 can comprise a plurality of driver circuits 36a, 38a, 40a, 42a, 44a that each generate a DC voltage for powering each of the autosensing module 36, the signal differentiating module 38, the signal conversion module 40, the amplifier module 42, and the feedback module 44, respectively.

It is to be appreciated that since the universal adapter 12 can convert any of a variety of different signaling conventions of analog and digital original driver signals into an LED-compatible driver signal, the universal adapter 12 can be compatible with different types of automated greenhouse controllers that use different communication platforms for controlling non-LED lights. As such, the universal adapter 12 can effectively be a "one-size fits-all" solution for easily retrofitting a conventional non-LED lighting system with LED light fixtures without requiring replacement of the automated greenhouse controller 11 or any of the other conventional communication infrastructure associated with the automated greenhouse controller.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. An adapter for a greenhouse and indoor grow automated controller, the adapter comprising:
    a power input configured for releasable electrical coupling with a power source to receive input power from the power source;
    a power output for releasable electrical coupling with an LED light fixture;
    a main bus electrically coupled with the power input and the power output, the main bus being configured to pass the input power from the power input directly to the power output to facilitate powering of an LED light fixture with the input power;
    a control input configured for releasable communicative coupling to an automated greenhouse controller to receive an original driver signal from the automated greenhouse controller;
    an autosensing module in signal communication with the control input and configured to detect a signal type of the original driver signal;
    a signal differentiating module in signal communication with the autosensing module and configured to detect a first communication protocol of the original driver signal based upon the signal type detected by the autosensing module;
    a signal conversion module in signal communication with the signal differentiating module to receive the first communication protocol and configured to convert the original driver signal into an LED-compatible driver signal that comprises a second communication protocol that is different from the first communication protocol; and
    a control output in signal communication with the signal conversion module and configured for releasable communicative coupling to the LED light fixture to facilitate transmission of the LED-compatible driver signal to the LED light fixture, wherein the signal conversion module is configured to convert the original driver signal into the LED-compatible driver signal based upon the first communication protocol detected by the signal differentiating module and the second communication protocol.

2. The adapter of claim 1 wherein the signal conversion module is configured to convert the original driver signal into the LED-compatible driver signal based upon a predefined map that defines a relationship between the first communication protocol and the second communication protocol.

3. The adapter of claim 1 further comprising an amplifier module in signal communication with the signal conversion module and the control output and configured to facilitate amplification of the original driver signal.

4. The adapter of claim 1 further comprising a transformer module electrically coupled with the power input, the autosensing module, the signal differentiating module, and the signal conversion module, wherein:
the power from the power source has a first voltage;
the transformer module is configured to transform the first voltage of the power into a second voltage for powering of the autosensing module, the signal differentiating module and the signal conversion module; and
the second voltage is less than the first voltage.

5. The adapter of claim 4 wherein the transformer module comprises a fly back circuit.

6. The adapter of claim 1 further comprising a feedback module that is configured to monitor at least one operational parameter of an LED light fixture and selectively adjust the LED-compatible driver signal in response to the at least one operational parameter.

7. The adapter of claim 1 wherein the signal differentiating module is configured to transmit protocol data to the signal conversion module that identifies the first communication protocol detected by the signal differentiating module.

8. The adapter of claim 7 wherein the signal conversion module is configured to convert the original driver signal into the LED-compatible driver signal based upon the protocol data.

9. The adapter of claim 1 wherein the signal conversion module is configured to query an LED light fixture for the second communication protocol.

10. The adapter of claim 1 wherein the signal conversion module is preprogrammed with the second communication protocol.

11. A lighting system for an indoor grow facility, the lighting system comprising:
an adapter comprising:
a power input configured to receive input power from a power source;
a power output;
a main bus electrically coupled with the power input and the power output, the main bus being configured to pass the input power from the power input directly to the power output;
a control input configured for releasable communicative coupling to an automated greenhouse controller to receive an original driver signal from the automated greenhouse controller;
an autosensing module in signal communication with the control input and configured to detect a signal type of the original driver signal;
a signal differentiating module in signal communication with the autosensing module and configured to detect a first communication protocol of the original driver signal based upon the signal type detected by the autosensing module;
a signal conversion module in signal communication with the signal differentiating module to receive the first communication protocol and configured to convert the original driver signal into an LED-compatible driver signal that comprises a second communication protocol that is different from the first communication protocol; and
a control output in signal communication with the signal conversion module; and
an LED light fixture comprising:
an LED driver circuit releasably communicatively coupled with the control output and releasably electrically coupled with the power output such that input power from the power input passes directly to the LED driver circuit via the power output to facilitate powering of the LED light fixture with the input power;
a plurality of LED lights electrically coupled with the LED driver circuit, wherein:
the signal differentiating module transmits the LED-compatible driver signal to the LED light fixture to facilitate control of the plurality of LED lights; and
the signal conversion module is configured to convert the original driver signal into the LED-compatible driver signal based upon the first communication protocol detected by the signal differentiating module and the second communication protocol.

12. The lighting system of claim 11 wherein the signal conversion module is configured to convert the original driver signal into the LED-compatible driver signal based upon a predefined map that defines a relationship between the first communication protocol and the second communication protocol.

13. The lighting system of claim 11 wherein the adapter further comprises an amplifier module in signal communication with the signal conversion module and the control output and is configured to facilitate amplification of the original driver signal.

14. The lighting system of claim 11 wherein the adapter further comprises a feedback module that is configured to monitor at least one operational parameter of the LED light fixture and selectively adjust the LED-compatible driver signal in response to the at least one operational parameter.

15. The lighting system of claim 11 wherein the signal differentiating module is configured to transmit protocol data to the signal conversion module that identifies the first communication protocol detected by the signal differentiating module.

16. The lighting system of claim 15 wherein the signal conversion module is configured to convert the original driver signal into the LED-compatible driver signal based upon the protocol data.

17. An adapter for a greenhouse and indoor grow automated controller, the adapter comprising:
a power input configured to receive input power from a power source;
a power output for electrical coupling with an LED light fixture;
a main bus electrically coupled with the power input and the power output, the main bus being configured to pass the input power from the power input directly to the power output to facilitate powering of an LED light fixture with the input power;
a control input configured to receive an original driver signal from an automated greenhouse controller;

an autosensing module in signal communication with the control input and configured to detect a signal type of the original driver signal;

a signal differentiating module in signal communication with the autosensing module and configured to detect a first communication protocol of the original driver signal based upon the signal type detected by the autosensing module;

a signal conversion module in signal communication with the signal differentiating module and configured to convert the original driver signal into an LED-compatible driver signal that comprises a second communication protocol that is different from the first communication protocol;

a control output in signal communication with the signal conversion module and configured to facilitate transmission of the LED-compatible driver signal to an LED light fixture; and a feedback module that is configured to monitor at least one operational parameter of an LED light fixture and selectively adjust the LED-compatible driver signal in response to the at least one operational parameter, wherein the signal conversion module is configured to convert the original driver signal into the LED-compatible driver signal based upon the first communication protocol detected by the signal differentiating module and the second communication protocol.

18. The adapter of claim 17 wherein:

the signal differentiating module is configured to transmit protocol data to the signal conversion module that identifies the first communication protocol detected by the signal differentiating module; and the signal conversion module is configured to convert the original driver signal into the LED-compatible driver signal based upon the protocol data.

19. A method for controlling operation of an LED light fixture with an adapter for a greenhouse and indoor grow automated controller, the method comprising:

receiving, by the adapter, an input power from a power source;

transmitting, by the adapter, the input power directly to the LED light fixture;

receiving, by the adapter, an original driver signal from an automated greenhouse controller;

detecting, by the adapter, a first communication protocol of the original driver signal;

receiving, by the adapter, identification of a second communication protocol required to communicate with the LED light fixture, the first communication protocol being different from the second communication protocol;

converting, by the adapter, the original driver signal into an LED-compatible driver signal that comprises the second communication protocol based upon the detected first communication protocol and the identified second communication protocol; and transmitting, by the adapter, the LED-compatible driver signal to the LED light fixture.

20. The method of claim 19 wherein converting, by the adapter, the original driver signal into the LED-compatible driver signal, comprises converting the original driver signal into the LED-compatible driver signal based upon a predefined map that defines a relationship between the first communication protocol and the second communication protocol.

* * * * *